(12) United States Patent
Ninomiya

(10) Patent No.: US 7,671,948 B2
(45) Date of Patent: Mar. 2, 2010

(54) LIQUID CRYSTAL DEVICE AND ELECTRONIC APPARATUS

(75) Inventor: Takanori Ninomiya, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 129 days.

(21) Appl. No.: 11/903,590

(22) Filed: Sep. 24, 2007

(65) Prior Publication Data

US 2008/0079879 A1    Apr. 3, 2008

(30) Foreign Application Priority Data

Sep. 29, 2006    (JP) ............................. 2006-266948

(51) Int. Cl.
*G02F 1/1335* (2006.01)
(52) U.S. Cl. ................... 349/117; 349/118; 349/119
(58) Field of Classification Search .......... 349/117–119
See application file for complete search history.

(56) References Cited

U.S. PATENT DOCUMENTS 7,097,306 B2 *   8/2006   Furuta et al. ................... 353/20

2006/0215091 A1 *   9/2006   Muramoto et al. ........... 349/117

FOREIGN PATENT DOCUMENTS

| JP | 2002-014345 A | 1/2002 |
|---|---|---|
| JP | 2002-131750 A | 5/2002 |
| JP | 2002-182213 | 6/2002 |
| JP | 2002-196136 A | 7/2002 |
| JP | 2003-270636 | 9/2003 |
| JP | 2004-151252 A | 5/2004 |
| JP | 2004-205593 | 7/2004 |
| JP | 2005-055455 A | 3/2005 |

* cited by examiner

*Primary Examiner*—Sung H Pak
*Assistant Examiner*—Eric Wong
(74) *Attorney, Agent, or Firm*—AdvantEdge Law Group, LLC

(57) ABSTRACT

A liquid crystal device includes a first substrate, a second substrate disposed to face the first substrate, a liquid crystal layer sandwiched between the first substrate and the second substrate, a first optical compensation plate fixed to the first substrate, a second optical compensation plate disposed at a side of the first substrate or the second substrate, and a pivot mechanism supporting the second optical compensation plate to be pivotable around an optical axis of light passing through the first substrate and the second substrate.

11 Claims, 8 Drawing Sheets

LIQUID CRYSTAL DEVICE AND ELECTRONIC APPARATUS

BACKGROUND

1. Technical Field

The present invention relates to a liquid crystal device such as a liquid crystal light valve and an electronic apparatus such as a liquid crystal projector having the liquid crystal device.

2. Related Art

In order to improve the use efficiency of incident light, micro lens arrays or micro lens array plates may be used together with liquid crystal devices. In such a case, since light to be vertically incident on a liquid crystal layer is collected by the micro lens array, the light has its direction changed and is made incident on the liquid crystal layer at an angle. When the light is incident on the liquid crystal layer at an angle, the light becomes out of phase, whereby the contrast and viewing angle of the liquid crystal device decrease.

For this reason, in liquid crystal devices having micro lens arrays, optical phase difference compensating elements are used. For example, in a liquid crystal projector disclosed in JP-A-2002-131750, as the optical phase difference compensating element, a film formed of an organic material is used. In JP-A-2002-14345, a discotic liquid crystal is used as the optical phase difference compensating element. In JP-A-2004-151252, a structural birefringence body formed of an inorganic material is disclosed. In the above-described technology, a phase difference of light that causes rays of light to be out of phase with each other is compensated by using such optical phase difference compensating elements, and thereby a decrease in the contrast is prevented and the viewing angle is widened.

When a compensation process is performed by using two or more optical phase difference compensating elements, an angle between the optical phase difference compensating elements is determined on the basis of characteristics of the liquid crystal. For example, when a TN (Twisted Nematic) mode is used, since the light is twisted by 90° by the liquid crystal layer, the optical phase difference compensating elements disposed in an incident side and an emitting side are arranged so as to form an angle of 90° therebetween. Accordingly, when the optical phase difference compensating elements are arranged, high precision is required for setting the angle therebetween. However, since many of the optical phase difference compensating elements having a film-like shape are arranged by being attached, it is very difficult to attain high precision for the arrangement. Furthermore, since there may be a case where attachment at a predetermined angle is not applicable, there is a technical problem in terms of operation efficiency or costs.

SUMMARY

An advantage of some aspects of the invention is that it provides a liquid crystal device capable of determining an alignment angle of the optical phase difference compensating element with high precision and various electronic apparatuses having the liquid crystal device.

According to a first aspect of the invention, there is provided a liquid crystal device comprising: a first substrate; a second substrate disposed to face the first substrate; a liquid crystal layer sandwiched between the first substrate and the second substrate; a first optical compensation plate fixed to the first substrate; a second optical compensation plate disposed at a side of the first substrate or the second substrate; and a pivot mechanism supporting the second optical compensation plate to be pivotable around an optical axis of light passing through the first substrate and the second substrate.

In the liquid crystal device, a phase difference generated in light such as projection light incident on the liquid crystal device can be compensated by the first optical compensation plate and the second optical compensation plate. In other words, if the liquid crystal device is operated, when light such as projection light is incident on the liquid crystal device, for example, serving as a liquid crystal light valve, first, a compensation process is performed for the light prior to its incidence on the liquid crystal layer, for example, by the first optical compensation plate. Next, a compensation process is performed for light emitted from the liquid crystal layer, for example, by the second optical compensation plate. By performing these compensation processes, it can be prevented together that light is incident on the liquid crystal layer in an out of phase state and light passing through the liquid crystal layer is incident on the emitting side polarizing plate in an out of phase state. In other words, it is possible to compensate for the phase difference of light generated by being passed through an optical element such as a micro lens array disposed at the incident side of the liquid crystal device and a phase difference of light generated by being passed through liquid crystal molecules that are located around a boundary of the liquid crystal layer or are not fully activated in displaying an intermediate gray scale by using the first and second optical compensation plates. Accordingly, since compensated light is incident on the emitting side polarizing plate, it is possible to prevent decrease in the contrast or viewing angle of the liquid crystal device due to leakage of light that is not to be transmitted or the like.

Between the first optical compensation plate and the second optical compensation plate, as described above, it is not required that one is disposed at the incident side of the liquid crystal layer and the other is disposed at the emitting side of the liquid crystal layer. In other words, both the first optical compensation plate and the second optical compensation plate may be disposed at the emitting side of the liquid crystal layer. In such a case, for example, for the light emitting from the liquid crystal layer, first, a compensation process may be performed by the first optical compensation plate and then, a compensation process may be performed by the second optical compensation plate. In that case, it can be prevented with high precision that the light passing through the liquid crystal layer is incident on the emitting side polarizing plate in an out of phase state. Alternatively, both the first optical compensation plate and the second optical compensation plate may be disposed at the incident side of the liquid crystal layer. In such a case, for the light prior to its incidence on the liquid crystal layer, first, a compensation process may be performed by the first optical compensation plate and then, a compensation process may be performed by the second optical compensation plate. In that case, it can be prevented with high precision that the light is incident on the liquid crystal layer in an out of phase state. In any case, since the first optical compensation plate does not have a pivot mechanism, the first optical compensation plate can be formed, for example, as a simple film, and accordingly, it is possible to dispose the first optical compensation plate on a side of one substrate which faces the liquid crystal. However, it is preferable in practical use to dispose the first optical compensation plate on a side, which does not face the liquid crystal, of one substrate, in view of simplifying a laminated structure on one side, which contacts the liquid crystal, of one between the substrates or not obstructing application of voltage to the liquid crystal. Since the second optical compensation plate has the pivot mechanism, even after the first and second optical compensation plates are disposed, an angle formed between the first optical compensation plate and the second optical compensation plate can be controlled by pivoting the second optical compensation plate, for example, around the optical axis of light such as projection light or the like. Although rotational movement performed by the pivot mechanism may be simple pivot around a fixed pivot axis, the rotational movement may be relatively complex movement having a floating rotational axis or combining rotational movement and parallel movement. While the second optical compensation plate has the pivot mechanism, it is disposed at a side, which does not face the liquid crystal, of one substrate or the other substrate. Accordingly, the pivot mechanism or rotational movement thereof does not require a complex laminated structure of the substrates on a side contacting the liquid crystal of one substrate or the other substrate and does not obstruct application of voltage to the liquid crystal.

When an angle between the first optical compensation plate and the second optical compensation plate is not formed to be a predetermined angle, an appropriate compensation process cannot be performed, and thereby improvement of the contrast is deteriorated or cannot be attained at all. In other words, for the compensation processes performed by the first and second optical compensation plates, an angle formed therebetween is very important and is required to be controlled with high precision. In the liquid crystal device, since the pivot mechanism is provided on the optical compensation plate, the angle can be adjusted even after disposition of the optical compensation plates. Thus, a delicate angle control process at a time when the first and second optical compensation plates are disposed is not required. Accordingly, it is possible to reduce a time required for a disposition operation of the optical compensation plates and prevent an increase in costs due to failure of the disposition operation.

Preferably, the pivot mechanism is configured to be fixable at a desired pivot angle. In other words, preferably, the pivot mechanism includes a fixing mechanism. However, a fixing mechanism for fixing the pivot angle may be provided separately from the pivot mechanism.

As described above, by providing the fixed first optical compensation plate and the second optical compensation plate having the pivot mechanism, it is possible to provide a liquid crystal device having high contrast at low cost while improving an operation efficiency thereof.

The liquid crystal device may further include a dust-proof glass layer disposed at the side, which does not face the liquid crystal layer, of at least one substrate from among the first substrate and the second substrate.

In such a case, by using the dust-proof glass, a liquid panel of the liquid crystal device can be protected from dusts or the like. Furthermore, it is possible to form the first optical compensation plate in the shape of a film for using the dust-proof glass as a member for fixing the first optical compensation plate. In such a case, the first optical compensation plate may be provided on a surface of a side, which is close to the liquid crystal layer, of the dust-proof glass or may be provided on a surface of a side, which is far from the liquid crystal layer, of the first dust-proof glass. Furthermore, the first optical compensation plate may be on surfaces of both sides of the dust-proof glass. The second optical compensation plate may be provided on a side, which is close to the liquid crystal layer, of the dust-proof glass or may be provided on a side, which is far from the liquid crystal layer, of the dust-proof glass. In addition, the first optical compensation plate may be provided on a surface of a side, on which the second optical compensation plate is not provided, of the second optical compensation plate side dust-proof plate. Accordingly, it is possible to perform an effective optical compensation process while minimizing required space and costs.

The second optical compensation plate may include a plurality of optical compensation plates, at least one of which has the pivot mechanism.

In such a case, compensation processes are performed in at least three places including the first optical compensation plate and the second optical compensation plate having plural optical compensation plates. Accordingly, the compensation effect is enhanced, and the decrease in the contrast or widening of the viewing angle is improved.

Two or more optical compensation plates having pivot mechanisms may be provided. In such a case, the angle control process with respect to the first optical compensation plate can be performed more easily. Generally, as the number of optical compensation plates increases, a time required for the angle control process of the optical compensation plates at a time when the optical compensation plates are disposed increases rapidly. However, a plurality of optical compensation plates of the liquid crystal device have the rotational mechanisms, so that the angle control process can be performed even after disposition of the optical compensation plates, and thereby the increase in the time required for the angle control process is reduced. Accordingly, it is possible to perform an effective optical compensation process without increasing the time required for disposition of the optical compensation plates.

The pivot mechanism can be configured to be pivot and then fix the second optical compensation plate such that an angle between a compensation direction of light and the first optical compensation plate is adjusted to be equal to or greater than 80° and equal to or less than 100°.

In such a case, the first optical compensation plate and the second optical compensation plate can be controlled to form an angle of around 90°, and accordingly, it is possible to perform an appropriate compensation process in accordance with a twisted direction of light in a liquid crystal device using a TN (Twisted Nematic) mode in which an incident side polarizing plate and an emitting side polarizing plate are aligned to form an angle of 90°. When the angle formed by the first and second optical compensation plates is less than 80°, the angle is too small, whereby polarization in the polarizing plate and the compensation process performed by the first and second optical compensation plates cannot be performed effectively or appropriately. On the other hand, when the angle formed by the first and second optical compensation plates is greater than 100°, the angle is too large, whereby polarization in the polarizing plate and the compensation process performed by the first and second optical compensation plates cannot be performed effectively or appropriately, likewise. However, in this case, the angle formed by the first and second optical compensation plates is equal to or greater than 80° and equal to or less than 100°, it is possible to prevent decrease in the contrast and reduction of the viewing angle in a liquid crystal device using the TN mode.

Generally, since high precision is required, it is difficult to dispose the first optical compensation plate and the second optical compensation plate so as to form a predetermined angle. However, since the second optical compensation plate has the pivot mechanism, the angle formed by the first and second optical compensation plates can be adjusted after disposition of the optical compensation plates, and accordingly, it is possible to precisely control the angle by a small amount.

The first optical compensation plate may be formed by coating with an inorganic material.

In such a case, since the fixed first optical compensation plate is formed of an inorganic material, deterioration thereof due to ultraviolet rays or the like does not occur. Thus, durability of the first optical compensation plate is improved. Furthermore, it is possible to form the first optical compensation plate by directly coating a disposition place thereof with the inorganic material using a method such as a deposition method. By using the method, a situation in which the first optical compensation plate cannot be disposed due to a form of the disposition place or the like does not occur. In other words, it is possible to dispose the first optical compensation plate in the disposition place in a simple manner without efforts for acquiring a disposition position.

In addition, since the first optical compensation plate is not required to be formed in the shape of a plate in advance, the number of components to be used, disposition space, and the number of processes in a manufacturing process thereof can be reduced. Furthermore, costs of the liquid crystal device can be reduced.

The first optical compensation plate may be a wide viewing angle film.

In such a case, the first optical compensation plate is formed by attaching the wide viewing angle film to the substrate or a support member that is additionally provided. Thus, disposition of the first optical compensation plate is completed by only an attachment process and the disposition of the first optical compensation plate occupies small space. The angle control of a compensation direction is performed by the second optical compensation plate having the pivot mechanism. Thus, it is possible to perform an effective optical compensation process for incident light with the time and space required for the process being reduced.

The liquid crystal device may further include an optical compensation plate having a pivot mechanism supporting the optical compensation plate to be pivotable around the optical axis of light passing through the first substrate and the second substrate.

In such a case, since the angle control process can be performed by the additional optical compensation plate, the degree of freedom for the control process is improved. For example, after the angle of the second optical compensation plate is controlled and the second optical compensation plate is fixed so as to be not pivotable, the additional optical compensation plate can be controlled in accordance with the angle of the second optical compensation plate. In other words, even in a case where the second optical compensation plate cannot be controlled or it is difficult to control the second optical compensation plate, in a manufacturing process, the angle control process can be performed by the additional optical compensation plate, and accordingly, the angle formed by the additional optical compensation plate and the second optical compensation plate can be controlled appropriately.

The liquid crystal device may further include a micro lens array disposed at a light-incident side of the liquid crystal layer.

In such a case, a phase difference of light, which is bent by the micro lens array, generated in the liquid crystal layer or the like is compensated by the first optical compensation plate and the second compensation plate. Accordingly, it can be prevented that light passing through the liquid crystal layer is incident on the emitting side polarizing plate in an out of phase state. In other words, it is possible to compensate for a phase difference of light which is generated at a time when the light refracted by being passed through the micro lens array provided on the incident side of the liquid crystal device is incident on the liquid crystal layer or a phase difference of light generated by being passed through liquid crystal molecules that are located around a boundary of the liquid crystal layer or are not fully activated in displaying an intermediate gray scale.

As described above, although the possibility that a phase difference is generated increases due to the micro lens array, an appropriate angle formed by the first optical compensation plate and the second optical compensation can be maintained by performing the angle control process using the second optical compensation plate having the pivot mechanism, and accordingly, it is possible to perform an effective optical compensation process. Thus, for example, there is a very low possibility that light not to be passed through the emitting side polarizing plate leaks, whereby the reduction of the contrast or viewing angle of the liquid crystal device can be prevented effectively.

The liquid crystal device may further include a first polarizing plate disposed at a first optical compensation plate side of the liquid crystal layer and a second polarizing plate disposed at a side of the liquid crystal layer other than a first polarizing plate side. The first optical compensation plate is formed on the first polarizing plate.

In such s case, since the first optical compensation plate is required to be formed on the first polarizing plate, the first optical compensation plate in the shape of a film may be attached to the first polarizing plate. Accordingly, it is possible to reduce space and costs for the formation of the first optical compensation plate.

The second polarizing plate may have a pivot mechanism supporting the second polarizing plate to be pivotable around the optical axis of light passing through the first substrate and the second substrate.

In such a case, the second polarizing plate can be pivotable by the additional pivot mechanism of the second polarizing plate. Thus, it is possible to control the angle formed by the second polarizing plate and the first polarizing plate or the first and second optical compensation plates by pivoting the second polarizing plate.

According to a second aspect of the invention, there is provided an electronic apparatus having the above-described liquid crystal device.

Since the electronic apparatus has the above-described liquid crystal device, various electronic apparatuses such as a projection-type display device, a television set, a cellular phone, an electronic diary, a word processor, a viewfinder-type or monitor direct view-type video cassette recorder, a workstation, a video phone, a POS terminal, and a touch panel, which can improve an operation efficiency and decrease producing costs thereof, having high contrast can be implemented by using the electronic apparatus.

The features and other advantages of the present invention will become more apparent by describing in detail the following preferred embodiments thereof.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the present invention will be described with reference to the accompanying drawings. In the following embodiments, as an example of a liquid crystal device according to an embodiment of the invention, a liquid crystal device having a built-in driving circuit which is driven by a TFT active matrix will be described.

First Embodiment

Figure 1:
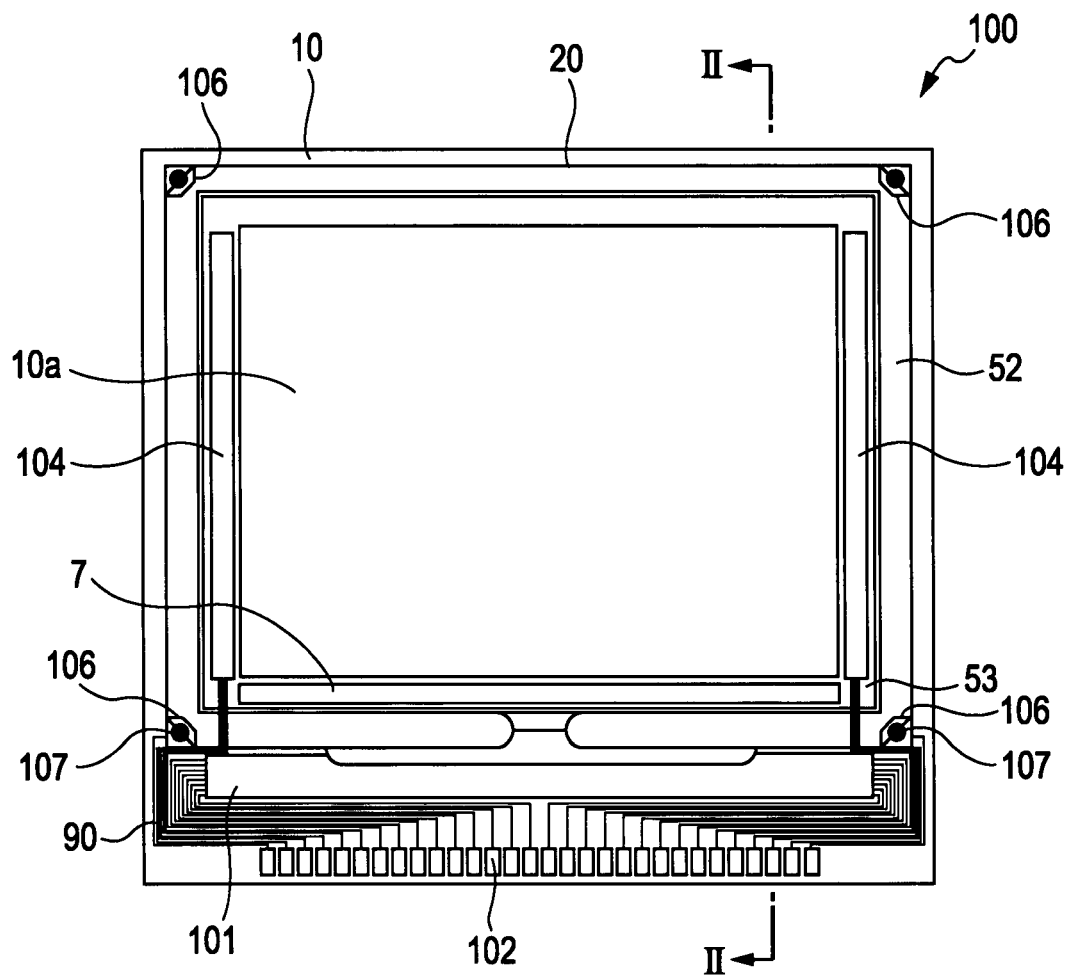
FIG. 1 is a plan view of a liquid crystal device according to a first embodiment of the present invention, showing its whole structure.
Figure 2:
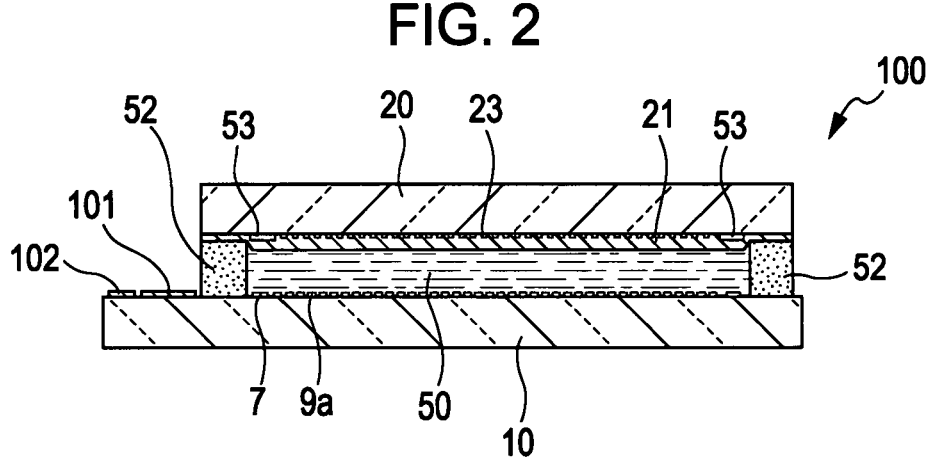
FIG. 2 is a sectional view of FIG. 1 taken along line H-H'.

First, a liquid crystal panel 100 constituting a liquid crystal device according to a first embodiment of the invention will be described with reference to FIGS. 1 and 2. FIG. 1 is a plan view of the liquid crystal panel 100 according to the embodiment, showing its structure. FIG. 2 is a sectional view of FIG. 1 taken along line H-H'. In FIGS. 1 and 2, an optical compensation plate, to be described in detail later, is not disposed and only the liquid crystal panel 100 is shown.

As shown in FIGS. 1 and 2, in the liquid crystal device according to this embodiment, a TFT array substrate 10 and an opposing substrate 20 are disposed to face each other. A liquid crystal layer 50 is sealed between the TFT array substrate 10 and the opposing substrate 20. The TFT array substrate 10 and the opposing substrate 20 are bonded to each other with a sealing member 52 provided in a sealing area located around an image display area 10a.

As shown in FIG. 1, an opaque frame-shaped light-shielding film 53 that defines a frame area of the image display area 10a is provided on an opposing substrate 20 side and inside the sealing area in which the sealing member 52 is disposed. Of a peripheral area, in an outer area located on an outer side of the sealing area in which the sealing member 52 is disposed, a data line driving circuit 101 and an external circuit connecting terminal 102 are provided along one side of the TFT array substrate 10. A sampling circuit 7 is provided in an inner side relative to the sealing area formed along one side such that the sampling circuit 7 is covered with the frame-shaped light-shielding film 53. Scan line driving circuits 104 are provided on an inner side of the sealing area formed along two sides adjacent to the one side such that the scan line driving circuits 104 are covered with the frame light-shielding film 53. On the TFT array substrate 10, in areas facing four corner portions of the opposing substrate 20, upper and lower conduction terminals 106 for connecting the TFT array substrate 10 and the opposing substrate 20 with upper and lower conduction materials 107 are disposed. Accordingly, electrical conduction between the TFT array substrate 10 and the opposing substrate 20 can be made.

On the TFT array substrate 10, wiring 90 for electrically connecting the external circuit connecting terminal 102 and the data line driving circuit 101, the scan line driving circuit 104, the upper and lower conduction terminals 106 or the like to each other is formed.

As shown in FIG. 2, on the TFT array substrate 10, a stacked structure in which TFTs (Thin Film Transistors), which are driving elements for pixel switching, and wiring such as scan lines and data lines is formed. In the image display area 10a, pixel electrodes 9a are formed in the shape of a matrix in an upper layer of the TFTs for pixel switching or an upper layer of wiring such as scan lines and data lines. On the pixel electrode 9a, an orientation film is formed. A light-shielding film 23 is formed on a side of the opposing substrate 20 which faces the TFT array substrate 10. The light-shielding film 23, for example, is formed of a light-shielding metal film or the like and is patterned, for example, to be in the shape of a lattice or the like in the image display area 10a on the opposing substrate 20. On the light-shielding film 23, an opposing electrode 21 made of a transparent material such as ITO is formed in a solid form to face the plurality of pixel electrodes 9a. An orientation film is formed on the opposing electrode 21. The liquid crystal layer 50 includes, for example, liquid crystals in which one or more types of nematic liquid crystals are mixed and maintains a predetermined orientation status between a pair of the orientation films.

Although not shown in the figure, a test circuit, a test pattern, or the like which is used for testing the quality or detecting defects of the liquid crystal device during a manufacturing process thereof or after the manufacturing process may be formed on the TFT-array substrate 10, in addition to the data driving circuit 101 and the scan line driving circuit 104.

Hereinafter, an optical compensation plate according to this embodiment will be described with reference to FIGS. 3 to 5.

First, a disposition position of the optical compensation plate will be described with reference to FIG. 3. FIG. 3 is a sectional view of a liquid crystal device according to an embodiment of the invention, showing its structure and a pathway of incident light. In drawings hereinafter, detailed constituent members of the liquid crystal panel 100 shown in FIGS. 1 and 2 are omitted as appropriate and only constituent members thereof which are directly related to descriptions will be shown.

Figure 3:
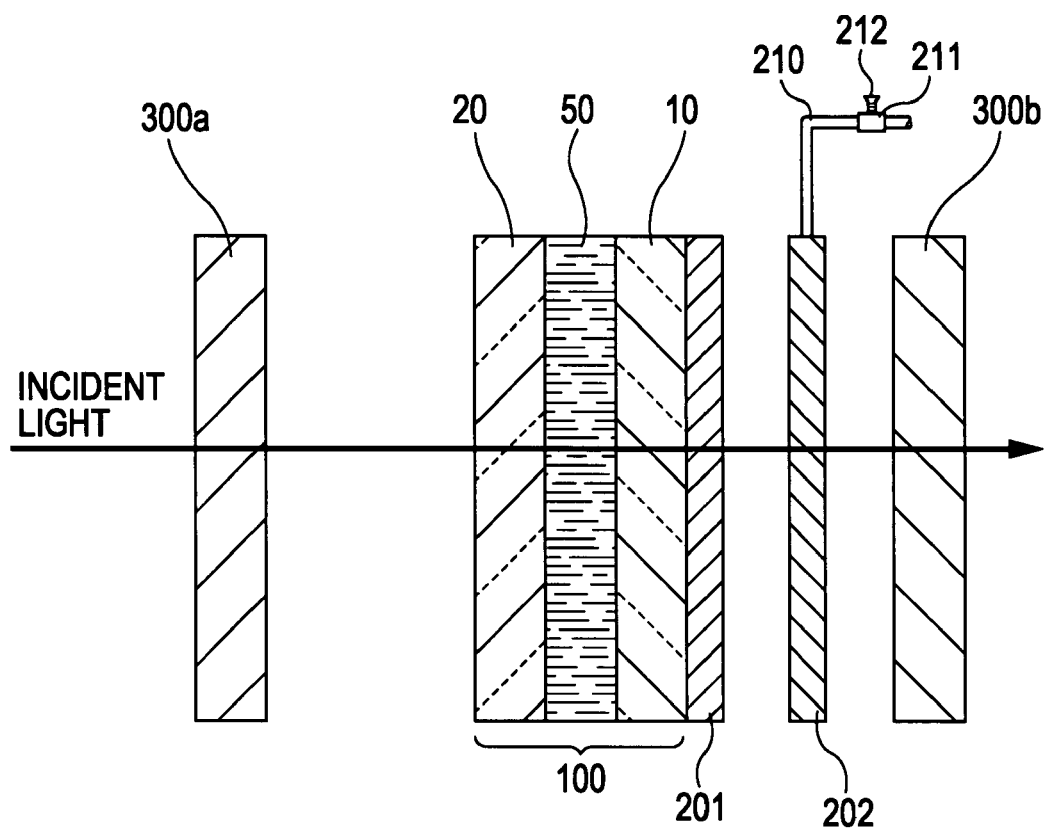
FIG. 3 is a sectional view of a liquid crystal device according to an embodiment of the invention, showing its structure and a pathway of incident light.

As shown in FIG. 3, the liquid crystal panel 100 includes a liquid crystal layer 50, and a TFT array substrate 10 and an opposing substrate 20 which sandwich the liquid crystal layer 50 therebetween. Polarizing plates 300a and 300b are disposed such that the liquid crystal panel 100 is interposed therebetween. A first optical compensation panel 201 is provided on a side of the TFT array substrate 10 opposite the liquid crystal layer 50 of the TFT array substrate 10, and a second optical compensation panel 202 is provided between an emitting side polarizing plate 300b and the liquid crystal panel 100. The second optical compensation panel 202 may be provided on an incident side of the liquid crystal panel 100. The second optical compensation plate 202 is attached to a main body of the liquid crystal device by a shaft 210 through a bearing 211 and has a pivot mechanism for angle control. In other words, a pivot mechanism according to this embodiment includes the shaft 210, the bearing 211, and a fixing screw 212, as an example. Here, the pivot mechanism according to this embodiment is built so as to include a fixing mechanism.

Next, a structure of the first optical compensation plate 201 will be described in detail. Since the first optical compensation plate 201 is an optical compensation plate attached to the liquid crystal panel 100, the first optical compensation plate 201 may be configured integrally with a member such as the TFT array substrate 10 or the opposing substrate 20 or may be formed on a liquid crystal layer 50 side of the TFT array substrate 10. Since the first optical compensation plate 201 is fixed, it is possible to control an angle formed by the first and second optical compensation plates by using the second optical compensation plate 202 having the pivot mechanism with reference to an angle of the first optical compensation plate 201.

The first optical compensation plate 201 may be formed by performing coating with an inorganic material. By using this method, it is possible to dispose a member having a complicated form or the like. In addition, since the first optical compensation plate 201 is not required to be formed in the shape of a plate in advance, it is possible to reduce manufacturing costs of the liquid crystal device. Furthermore, since the first optical compensation plate 201 is formed of an inorganic material, deterioration thereof due to strong light such as ultraviolet rays does not occur. Basically, since strong light is emitted to an optical compensation plate during use thereof, it is effective for improvement of durability of the liquid crystal device to prevent the deterioration of the first optical compensation plate 201.

The first optical compensation plate 201 may be formed of a wide viewing angle film. In such a case, the first optical compensation plate 201 is provided on a side of the TFT array substrate 10 opposite the liquid crystal layer.

Next, a structure of the second optical compensation plate will be described in detail with reference to FIG. 4. FIG. 4 is a perspective view of optical compensation plates according to an embodiment of the invention, showing its structure.

Figure 4:
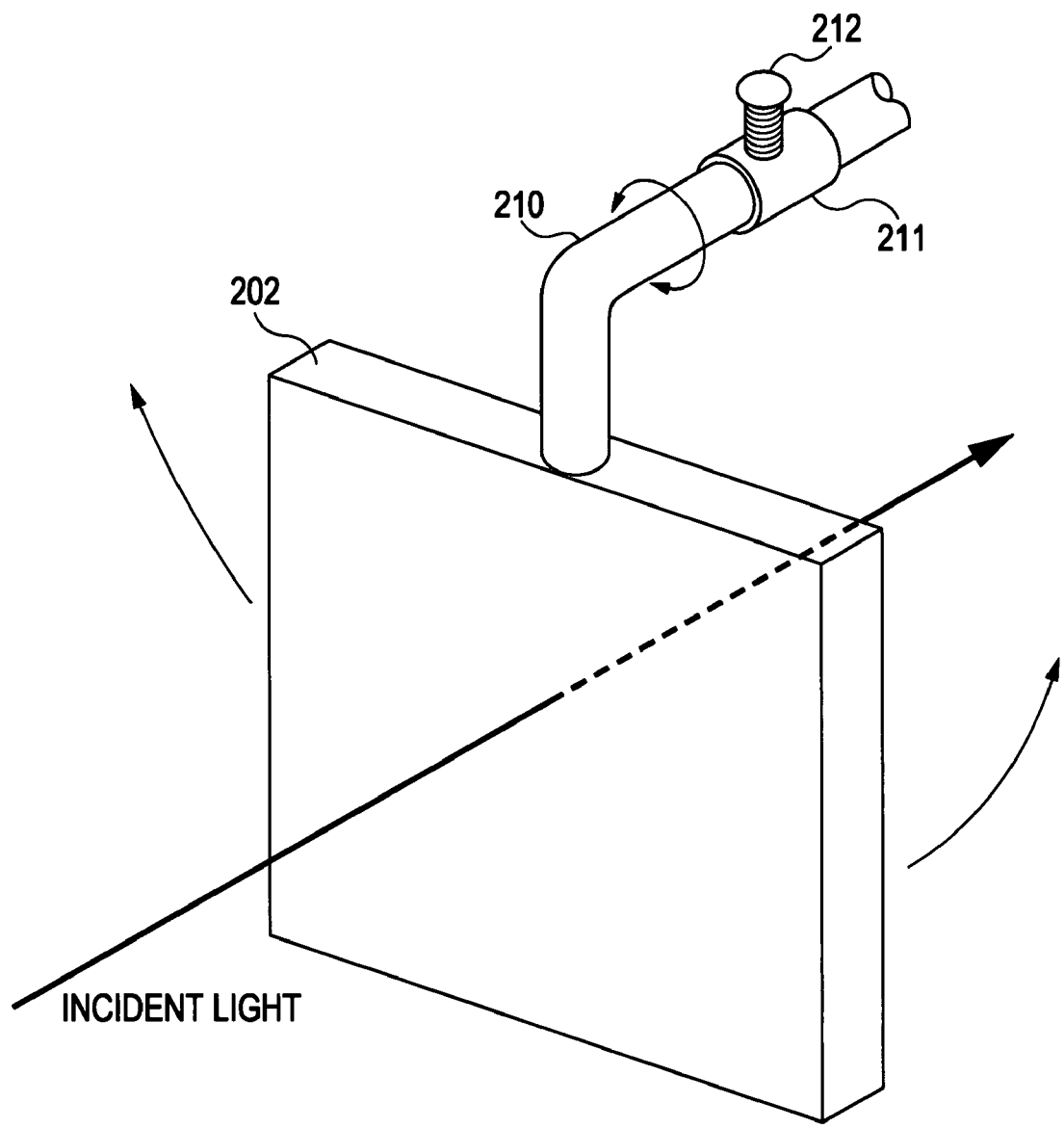
FIG. 4 is a perspective view of optical compensation plates according to an embodiment of the invention, showing the structure of a pivot mechanism.

As shown in FIG. 4, on the top of the second optical compensation plate 202, the shaft 210 that is bent by 90° is attached. The shaft 210 is held so as to be freely pivotable through the bearing 211 attached to the liquid crystal device. In the bearing 211, the fixing screw 212 that is an example of a fixing mechanism included in the pivot mechanism according to this embodiment is provided. The shaft 210 can be fixed so as to be not pivotable by tightening the fixing screw 212. In other words, the second optical compensation plate 202 can be pivotable around the bearing 211 and be fixed at an arbitrary angle. Accordingly, it is possible to control an angle formed by the first and second optical compensation plates by pivoting the second optical compensation plate 202 using the above-described structure.

The above-described structure is only an example of the pivot mechanism of the second optical compensation plate 202 according to this embodiment, and thus, the structure of the pivot mechanism may be changed appropriately in accordance with the structure of the liquid crystal device. Therefore, the second optical compensation plate 202 having the above-described pivot mechanism is construed as being included in the technical scope of the present invention.

Next, the angle formed by the first optical compensation plate 201 and the second optical compensation plate 202 will be described with reference to FIG. 5. FIG. 5 is a perspective view of a compensation direction of the optical compensation plates. Here, a case where the liquid crystal is configured to be in a TN mode will be described.

Figure 5:
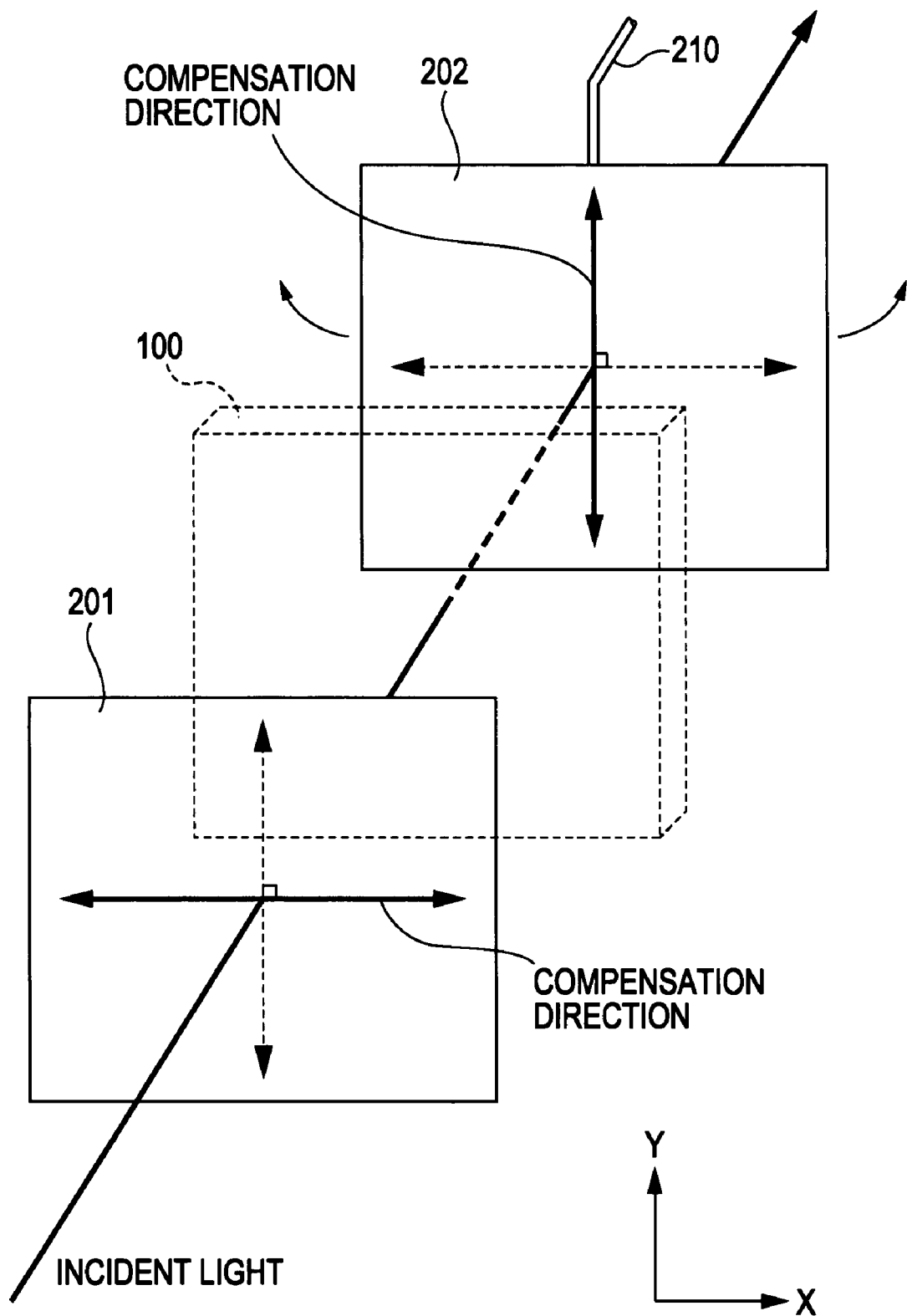
FIG. 5 is a perspective view of a compensation direction of the optical compensation plates.

In FIG. 5, the first optical compensation plate 201 is assumed to be fixed for compensation in direction X. In a TN mode liquid crystal, light is twisted by 90° in the liquid crystal layer 50. Thus, the second optical compensation plate 202 is disposed so as to compensate for the light in direction Y that is perpendicular to direction X.

In that case, when the second optical compensation plate 202 does not have a pivot mechanism, the angle cannot be adjusted after disposition of the optical compensation plates, and accordingly, a disposition process with very high precision is required. On the other hand, when the second optical compensation plate 202 has a pivot mechanism, the angle can be adjusted after disposition of the optical compensation plates by pivoting the second optical compensation plate 202 in a left-to-right or right-to-left direction in FIG. 5. Accordingly, it is possible to adjust the angle while the liquid crystal device is operated for testing and a displayed image or motion picture is checked. In other words, since the angle can be controlled while actual operation is evaluated, it is possible to perform the angle control process precisely in a speedy manner. It is preferable that the second optical compensation plate 202 is formed integrally with dust-proof glass or the like.

Therefore, by adding the pivot mechanism, it is possible to reduce a time required for setting the liquid crystal device in a production process thereof, prevent an increase in costs due to disposition failure, and improve an image quality on the basis of optimization of the angle between the optical compensation plates.

When the liquid crystal is configured to be operated in a mode other than the TN mode, for example, a VA (Vertical Alignment) mode or an IPS (In-Plane-Switching) mode, the optical compensation plates are disposed to have an angle optimal for the liquid crystal mode.

Next, units of the liquid crystal device will be described in accordance with a pathway of incident light with reference back to FIG. 3.

As shown in FIG. 3, first, light is incident on the incident side polarizing plate 300a. Light that oscillates in a predetermined direction can pass through the polarizing plate 300a. In other words, the incident light becomes straight polarized light. The incident light passing through the polarizing plate 300a is incident on the liquid crystal layer 50 through the opposing substrate 20. In this case, there are liquid crystal molecules around a boundary of the liquid crystal layer 50 which are not completely activated when voltage is applied. Thus, the light incident on the liquid crystal layer 50 enters an out of phase state. The light passing through the liquid crystal layer 50, as shown in FIG. 3, passes through the TFT array substrate 10, is emitted from the liquid crystal panel 100, and is compensated by the first optical compensation plate 201. Then, the light is incident on the second optical compensation plate 202 whose angle is controlled by the pivot mechanism. In the second optical compensation plate 202, the phase difference generated in the liquid crystal layer 50 is compensated, and the light becomes straight polarized light again. The compensated light is incident on the emitting side polarizing plate 300b, and only light twisted by 90° by the liquid crystal layer 50 passes through the polarizing plate 300b.

As described above, a phase difference of incident light is compensated in two places of the first optical compensation plate 201 and the second optical compensation plate 202 so as to form a straight polarized light, and accordingly, it is possible to prevent reduction of contrast of an image displayed in the liquid crystal device and widen the viewing angle of the liquid crystal device, effectively.

The first optical compensation plate 201 corresponds to the TFT array substrate 10, and the second optical compensation plate 202 corresponds to the opposing substrate 20. In particular, the optical compensation direction of the first optical compensation plate 201 is set in accordance with the orientation direction of the TFT array substrate 10 provided on a light-emitting side of the liquid crystal layer 50. In addition, the optical compensation direction of the second optical compensation plate 202 is set in accordance with the orientation direction of the opposing substrate 20 provided on a light incident side of the liquid crystal panel 100. Accordingly, the contrast of the liquid crystal device can be improved.

Second Embodiment

Figure 6:
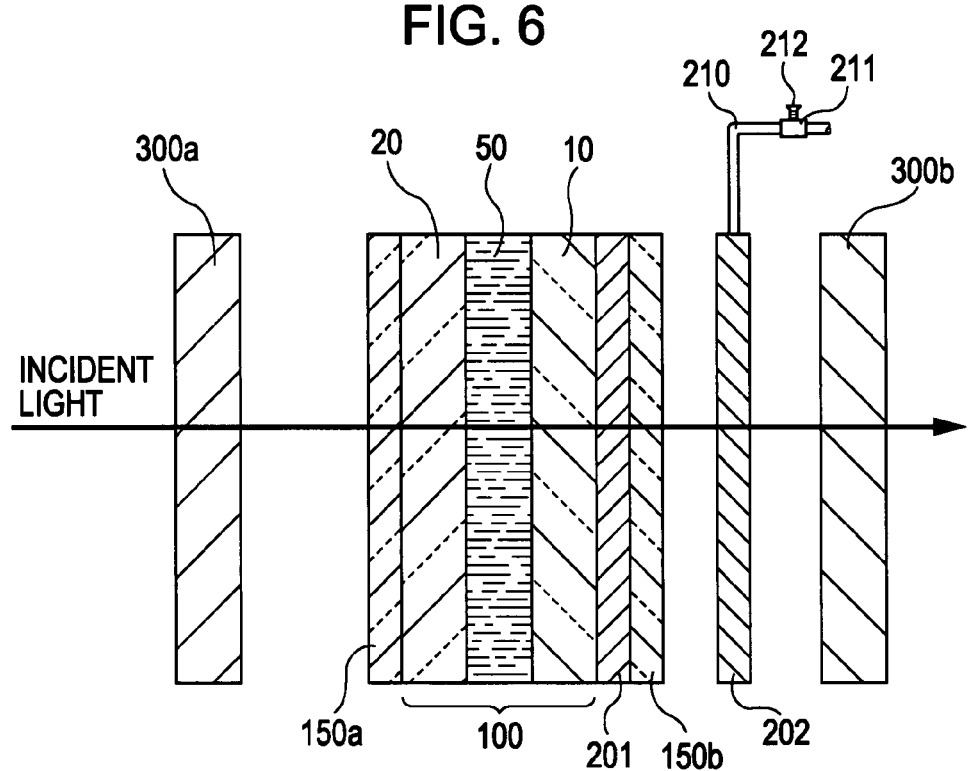
FIG. 6 is a sectional view showing a structure of a liquid crystal device according to a second embodiment of the invention, having a dust-proof glass and a pathway of incident light.

Hereinafter, a second embodiment of the invention will be described with reference to FIG. 6. The dust-proof glass 150 and structure of the optical compensation plates in the second embodiment are different from those in the above-described first embodiment, and other components in the second embodiment are the same as those in the first embodiment. Thus, in the second embodiment, only the dust-proof glass 150 and the optical compensation plates will be described, and descriptions for other components will be omitted appropriately. FIG. 6 is a sectional view showing a structure of a liquid crystal device according to an embodiment of the invention, having the dust-proof glass and a pathway of incident light, like FIG. 3.

As shown in FIG. 6, a first dust-proof glass 150a is provided on an incident side of the liquid crystal panel 100, and a second dust-proof glass 150b is provided on an emitting side of the liquid crystal panel 100. The second optical compensation plate 202 may be provided on a liquid crystal panel 100 side of the second dust-proof glass 150b. Alternatively, the second optical compensation plate 202 may be formed integrally with the first dust-proof glass 150a disposed at the incident side.

By adding the dust-proof glasses 150, it can be prevented that dusts or the like enter inside the liquid crystal panel 100 to cause problems. In addition, the first optical compensation plate 201 is disposed at a surface of the dust-proof glass 150b, and accordingly, it is not required to additionally use a base member or a fixing member for the disposition, whereby it is possible to prevent reduction of the contrast of the liquid crystal device and to widen the viewing angle thereof by performing an optical compensation process for incident light while space and costs required for the addition of the dust-proof glasses are reduced.

Third Embodiment

Figure 7:
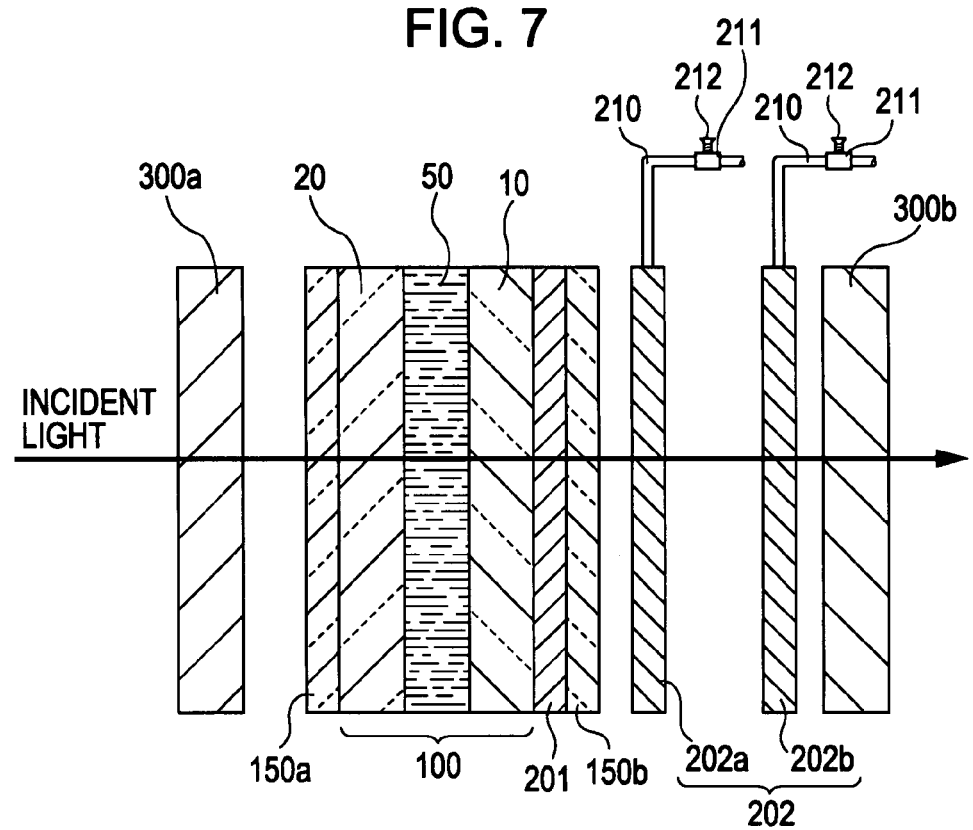
FIG. 7 is a sectional view showing a structure of a liquid crystal device according to a third embodiment of the invention, having two second compensation plates and a pathway of incident light.

Hereinafter, a third embodiment of the invention will be described with reference to FIG. 7. The structure of the optical compensation plates in the third embodiment are different from those in the above-described second embodiment, and other components in the third embodiment are the same as those in the second embodiment. Thus, in the third embodiment, only the optical compensation plates will be described, and descriptions for other components will be omitted appropriately. FIG. 7 is a sectional view showing a structure of a liquid crystal device according to an embodiment of the invention, having two of the second compensation plates and a pathway of incident light, like FIG. 3.

As shown in FIG. 7, the first optical compensation plate 201 is provided on a surface of a side, from which light of the liquid crystal panel 100 emits, of the dust-proof glass 150b. In addition, there are two second optical compensation plates 202 including a second optical compensation plate 202a provided on an emitting side of the light-emitting side dust-proof glass 150b and a second optical compensation plate 202b provided on an emitting side of the second optical compensation plate 202a. The first optical compensation plate 201 is formed integrally with the liquid crystal panel 100. Alternatively, the first optical compensation plate 201 may be formed integrally with the dust-proof glass 150 or other substrates or be provided independently. Furthermore, the first optical compensation plate 201 may be provided by being shaped in a film and attached to other member. One between the second optical compensation plates 202a and 202b may not have the pivot mechanism.

In this embodiment, by adjusting the first optical compensation plate 201 and the two second optical compensation plates 202a and 202b, a compensation process is performed in at least three places. Accordingly, the effect of compensation is improved, and it is possible to prevent reduction of the contrast and widen the viewing angle, still further.

Fourth Embodiment

Figure 8:
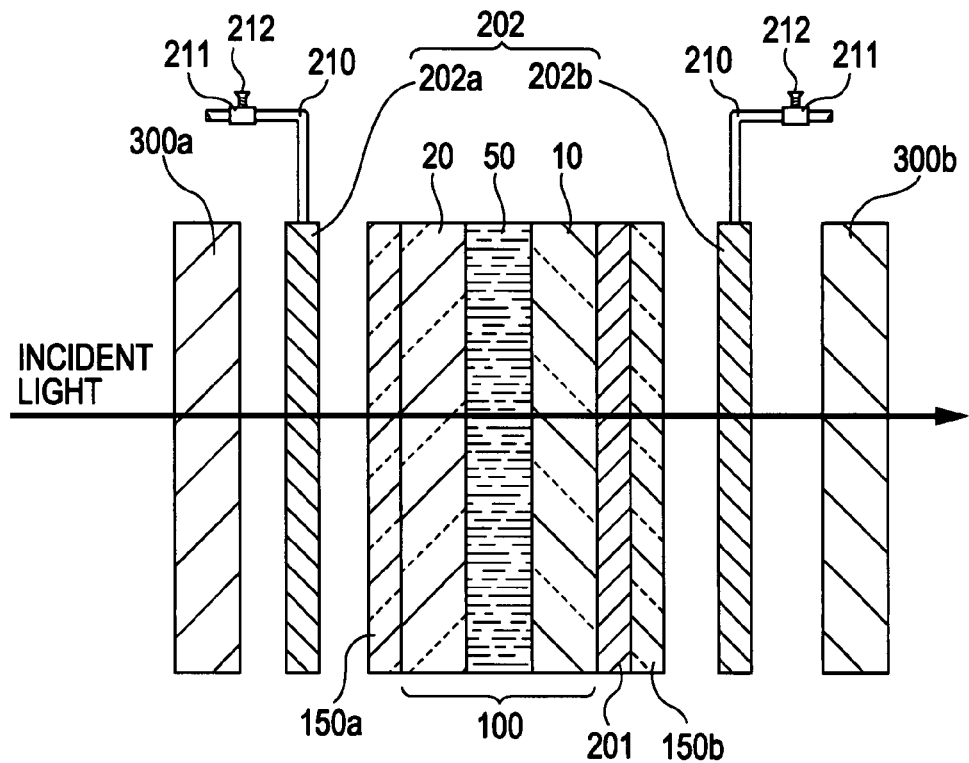
FIG. 8 is a sectional view showing a structure of a liquid crystal device according to a fourth embodiment of the invention, including a first optical compensation plate having a pivot mechanism and a pathway of incident light.

Hereinafter, a fourth embodiment of the invention will be described with reference to FIG. 8. The structure of the optical compensation plates in the fourth embodiment are different from those in the above-described third embodiment, and other components in the fourth embodiment are the same as those in the third embodiment. Thus, in the fourth embodiment, only the optical compensation plates will be described, and descriptions for other components will be omitted appropriately. FIG. 8 is a sectional view showing a structure of a liquid crystal device according to an embodiment of the invention, including a first optical compensation plate having a pivot mechanism and a pathway of incident light, like FIG. 3.

As shown in FIG. 8, the second optical compensation plates 202 are provided on a light incident side of the liquid crystal layer 50 and a light-emitting side of the liquid crystal layer 50. The second optical compensation plates 202 have pivot mechanisms including a shaft 210, a bearing 211, and a fixing screw 212, respectively. The second optical compensation plate 202b having the pivot mechanism is provided on the light-emitting side of the liquid crystal layer 50. The second optical compensation plate 202a having the pivot mechanism is provided on the light incident side of the liquid crystal layer 50. As shown in FIG. 8, the second optical compensation plates 202a and 202b are formed integrally with the dust-proof glasses 150a and 150b.

In this embodiment, since the second optical compensation plate 202a, in addition to the second optical compensation plate 202b, has the pivot mechanism, the angle between the optical compensation plates can be controlled by pivoting the second optical compensation plate 202a. In other words, even after the angle of the second optical compensation plate 202b is controlled and the second optical compensation plate 202b is fixed so as to be not pivotable, the angle can be controlled by pivoting the second optical compensation plate 202a. For example, in a production process, when a cover or the like is attached to an emitting side of the liquid crystal layer 50 and it is difficult to control the second optical compensation plate 202b, the angle can be controlled by using the second optical compensation plate 202a. Therefore, the compensation process can be performed effectively, and it is possible to prevent reduction of the contrast and widen the viewing angle.

Fifth Embodiment

Figure 9:
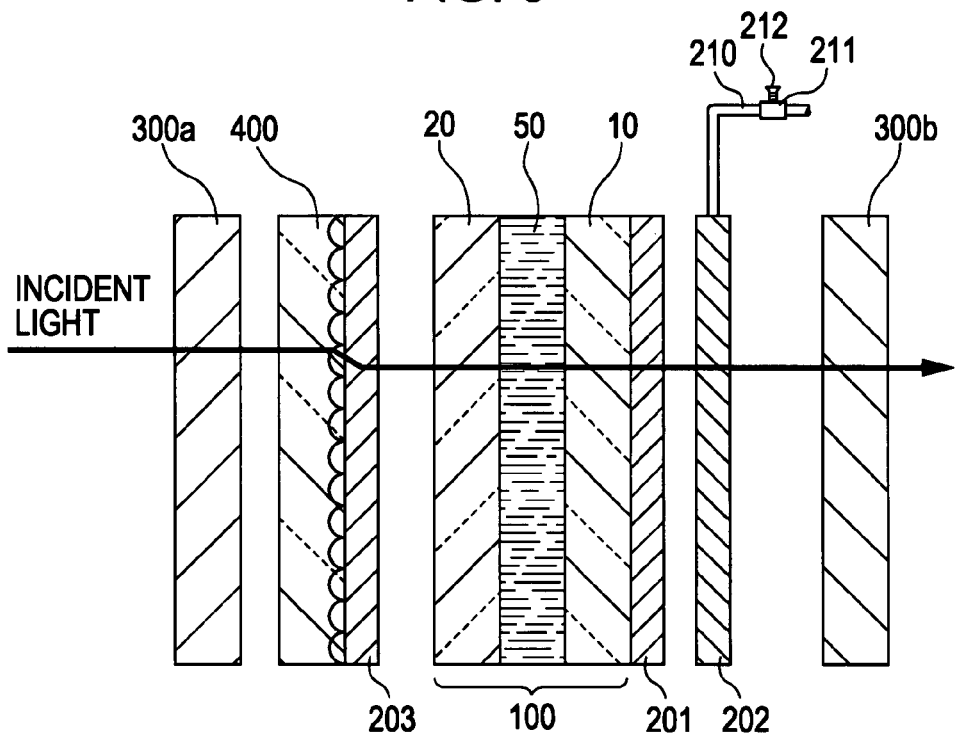
FIG. 9 is a sectional view showing a structure of a liquid crystal device according to a fifth embodiment of the invention, having a micro lens array and a pathway of incident light.

Hereinafter, a fifth embodiment of the invention will be described with reference to FIG. 9. In the fifth embodiment, a micro lens array 400 and the structure of the optical compensation plates are different from those in the above-described first embodiment, and other components in the fifth embodiment are the same as those in the first embodiment. Thus, in the fifth embodiment, only the micro lens array 400 and the optical compensation plates will be described, and descriptions for other components will be omitted appropriately. FIG. 9 is a sectional view showing a structure of a liquid crystal device including a first optical compensation plate having a pivot mechanism and a pathway of incident light, having a micro lens array and a pathway of incident light, like FIG. 3.

As shown in FIG. 9, the micro lens array 400 is provided between the incident side polarizing plate 300a and the liquid crystal panel 100. Between the micro lens array 400 and the liquid crystal panel 100, a third optical compensation plate 203 is provided, and the second optical compensation plate 202 is provided between the liquid crystal panel 100 and the emitting side polarizing plate 300b. Alternatively, the second optical compensation plate 202 may be provided on the incident side. The first optical compensation plate 201 may be formed integrally with the micro lens array 400, other substrates, or the like and may be formed independently. In the liquid crystal panel 100, the micro lens array is disposed in an area of the incident side of the liquid crystal layer 50 so as to improve a substantial opening efficiency, that is, the use efficiency of light, brightness, and color purity. Since incident light is collected by a micro lens included in the micro lens array 400, the light is bent in the micro lens array 400. Since the bent light is not incident on the liquid crystal layer 50 vertically, a phase difference may be generated when the bent light is incident on the liquid crystal layer 50. Thus, a compensation process is performed by the third optical compensation plate 203, so that the light is incident on the liquid crystal layer 50 vertically. Then, the phase difference of the light generated in the liquid crystal layer 50 is compensated by the second optical compensation plate 202, of which angle is controlled, disposed at the emitting side of the liquid crystal layer 50. Accordingly, the compensated light can be incident on the emitting side polarizing plate 300b, it is possible to prevent reduction of the contrast and widen the viewing angle.

Sixth Embodiment

Figure 10:
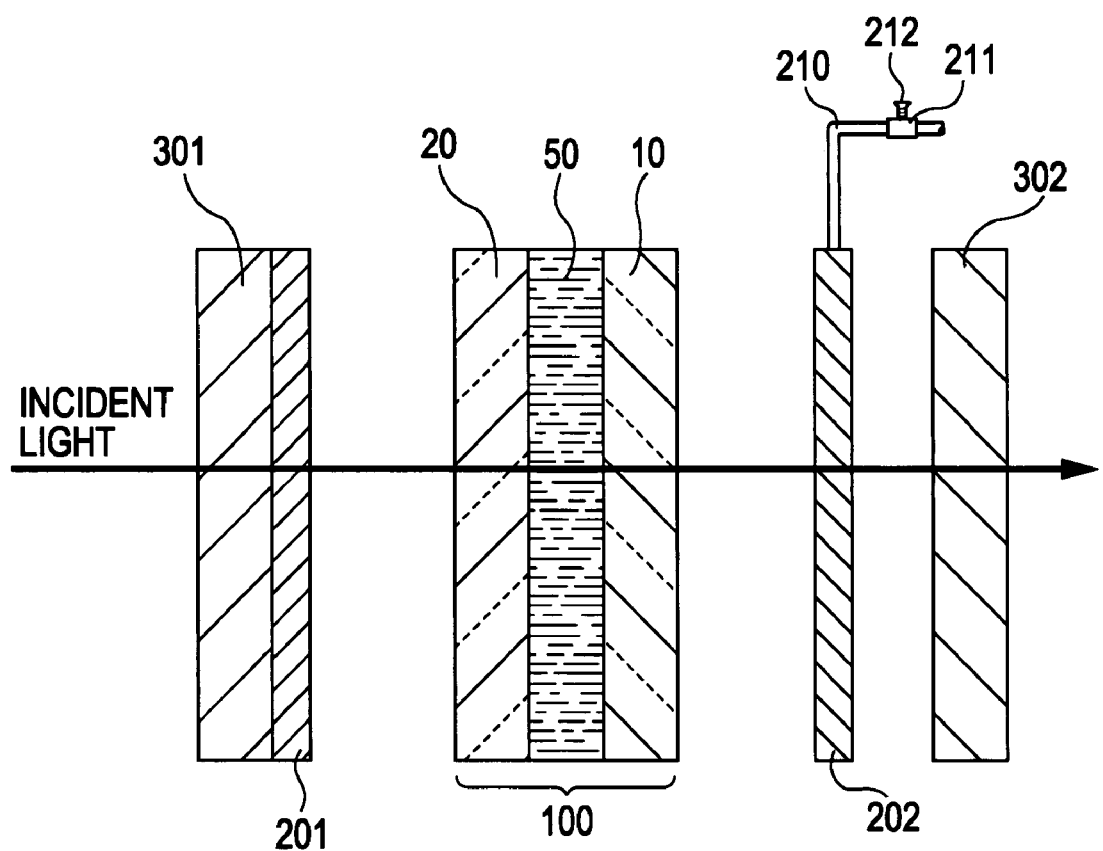
FIG. 10 is a sectional view showing a structure of a liquid crystal device according to a sixth embodiment of the invention, having a first optical compensation plate that is formed integrally with a polarizing plate and a pathway of incident light.

Hereinafter, a sixth embodiment of the invention will be described with reference to FIG. 10. In the sixth embodiment, the structures of the polarizing plate 300 and the optical compensation plates are different from those in the above-described first embodiment, and other components in the sixth embodiment are the same as those in the first embodiment. Thus, in the sixth embodiment, only the polarizing plate 300 and the optical compensation plates will be described, and descriptions for other components will be omitted appropriately. FIG. 10 is a sectional view showing a structure of a liquid crystal device including a first optical compensation plate having a pivot mechanism and a pathway of incident light, having a first optical compensation plate that is formed integrally with the polarizing plate and a pathway of incident light, like FIG. 3.

As shown in FIG. 10, the first optical compensation plate 201 is provided by being formed integrally with the first polarizing plate 301 or formed in the shape of a film and attached to the surface of the first polarizing plate 301.

In this embodiment, the angle formed by the first optical compensation plate 201 and the second optical compensation plate 202 can be controlled by changing the angle of the second optical compensation plate 202. Since it is preferable that the angle formed by the first and second optical compensation plates and the angle formed by the first and second polarizing plates are identical to each other, this control method is very effective.

In this embodiment, the second polarizing plate 302 may be configured to be pivotable.

Electronic Apparatus

Figure 11:
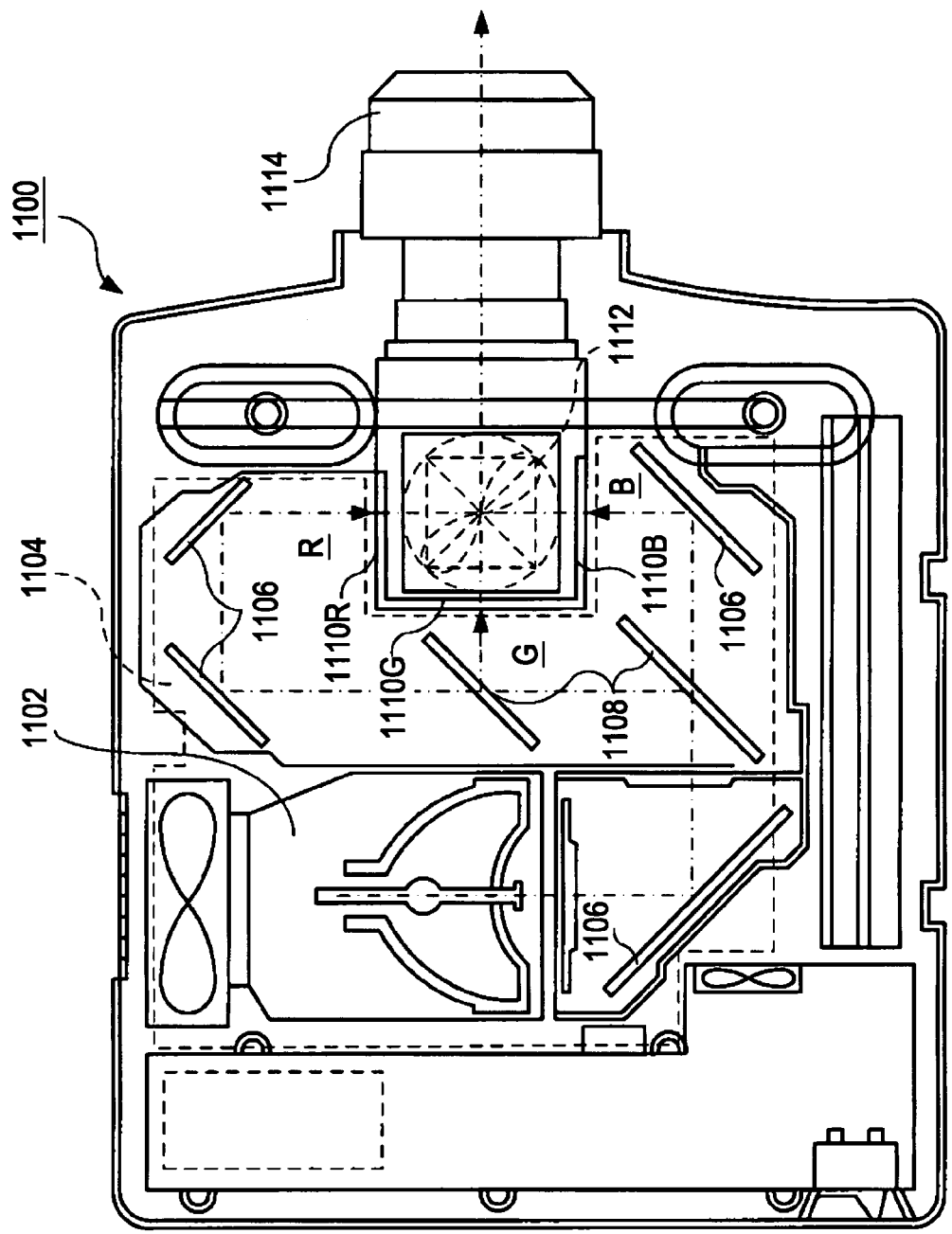
FIG. 11 is a plan view showing a structure of a projector according to an embodiment of the invention as an example of an electronic apparatus in which a liquid crystal device is used.

Hereinafter, a case where the above-described liquid crystal device is used in a projector as a light valve will be described. FIG. 11 is a plan view showing a structure of a projector according to an embodiment of the invention.

As shown in FIG. 11, inside the projector 1100, a lamp unit 1102 including a white light source such as a halogen lamp is provided. The projection light emitted from the lamp unit 1102 is divided into primary colors of R, G, and B by four mirrors 1106 and two dichroic mirrors 1108 disposed inside a light guide 1104 and incident on the liquid crystal panels 1110R, 1110B, and 1110G as light valves.

The liquid crystal panels 1110R, 1110B, and 1110G have structures equivalent to that of the above-described liquid crystal device and are driven in accordance with signals of primary colors of R, G, and B supplied from an image signal processing circuit. The light modulated by the liquid crystal panels is incident on a dichroic prism 1112 from three directions. In the dichroic prism 1112, the light of R and B is refracted by 90 degrees and the light of G progresses straight. Accordingly, a composed image of the primary color light is projected on a screen or the like through a projection lens 1114.

Here, when display images displayed by the liquid crystal panels 1110R, 1110B, and 1110G are considered, the display image displayed by the liquid crystal panel 1110G needs to be inverted to left-to-right/right-to-left side with respect to the display images displayed by the liquid crystal panels 1110R and 1110B.

Furthermore, since light corresponding to primary colors of R, G, and B is incident on the liquid crystal panels 1110R, 1110B, and 1110G by using the dichroic mirror 1108, a color filter is not required.

Furthermore, a liquid crystal device according to an embodiment of the invention may be used in a television set, a viewfinder-type or monitor direct view-type video cassette recorder, a car navigator, a pager, an electronic diary, a calculator, a word processor, a workstation, a video phone, a POS terminal, an apparatus having a touch panel, or the like, along with the above-described electronic apparatuses with reference to FIG. 11.

Furthermore, the present invention may be applied to a reflection-type liquid crystal device (LCOS) in which elements are formed on a silicon substrate or the like, along with the liquid crystal device described in the above embodiments.

The present invention is not limited to the above-described embodiments, and various changes in form and details may be made appropriately therein without departing from the gist or spirit of the invention which can be conceived from the claims or the whole specification, and a liquid crystal device and an electronic apparatus in which the changes are made belong to the technical scope of the invention.

The entire disclosure of Japanese Patent Application No. 2006-266948, filed Sep. 29, 2006 is expressly incorporated by reference herein.

What is claimed is:

1. A projection display device comprising:
   a liquid crystal panel including:
      a first substrate,
      a second substrate disposed to face the first substrate,
      a liquid crystal layer sandwiched between the first substrate and the second substrate, and
      a first optical compensation plate fixed directly to the first substrate, the first substrate disposed between the first optical compensation plate and the liquid crystal layer;
   a second optical compensation plate disposed at a side of the first substrate or the second substrate of the liquid crystal panel; and
   a pivot mechanism supporting the second optical compensation plate to be pivotable around an optical axis of light passing through the first substrate and the second substrate, the pivot mechanism including:
      a bearing,
      a fixing screw, and
      a shaft being attached on the top of the second optical compensation plate, the shaft being held so as to be freely pivotable through the bearing and such that the shaft can be fixed so as to be not pivotable by tightening the fixing screw.

2. The projection display device according to claim 1, further comprising a dust-proof glass layer disposed at the side, which does not face the liquid crystal layer, of at least one substrate from among the first substrate and the second substrate.

3. The projection display device according to claim 1, wherein the second optical compensation plate includes a plurality of optical compensation plates, at least one of which has the pivot mechanism.

4. The projection display device according to claim 1, wherein the pivot mechanism can pivot and then fix the position of the second optical compensation plate such that an angle between a compensation direction of the first compensation plate and a compensation direction of the second compensation plate is adjusted to be equal to or greater than 80° and equal to or less than 100°.

5. The projection display device according to claim 1, wherein the first optical compensation plate comprises a coating of an inorganic material.

6. The projection display device according to claim 1, wherein the first optical compensation plate is a wide viewing angle film.

7. The projection display device according to claim 1, further comprising an optical compensation plate having a pivot mechanism supporting the optical compensation plate to be pivotable around the optical axis of light passing through the first substrate and the second substrate.

8. The projection display device according to claim 1, further comprising a micro lens array disposed at a light-incident side of the liquid crystal layer.

9. The projection display device according to claim 1, further comprising:
   a first polarizing plate disposed at a first optical compensation plate side of the liquid crystal layer; and
   a second polarizing plate disposed at a side of the liquid crystal layer other than a first polarizing plate side, and
   wherein the first optical compensation plate is formed on the first polarizing plate.

10. The projection display device according to claim 9, wherein the second polarizing plate has a pivot mechanism supporting the second polarizing plate to be pivotable around the optical axis of light passing through the first substrate and the second substrate.

11. The projection display device according to claim 1, wherein the first optical compensation plate is disposed between the first substrate and the second optical compensation plate.

* * * * *